US010277033B2

(12) United States Patent
Wu et al.

(10) Patent No.: US 10,277,033 B2
(45) Date of Patent: Apr. 30, 2019

(54) METHOD AND DEVICE FOR CONTROLLING DISTRIBUTED GENERATOR IN DISTRIBUTION SYSTEM

(71) Applicant: Tsinghua University, Beijing (CN)

(72) Inventors: Wenchuan Wu, Beijing (CN); Boming Zhang, Beijing (CN); Xin Chen, Beijing (CN); Hongbin Sun, Beijing (CN); Qinglai Guo, Beijing (CN); Bin Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 168 days.

(21) Appl. No.: 15/446,097

(22) Filed: Mar. 1, 2017

(65) Prior Publication Data
US 2018/0034277 A1     Feb. 1, 2018

(30) Foreign Application Priority Data

Jul. 29, 2016 (CN) .......................... 2016 1 0618112

(51) Int. Cl.
| | |
|---|---|
| *G05B 15/02* | (2006.01) |
| *H02J 3/38* | (2006.01) |
| *H02J 3/46* | (2006.01) |
| *H02J 3/00* | (2006.01) |

(52) U.S. Cl.
CPC .............. *H02J 3/381* (2013.01); *G05B 15/02* (2013.01); *H02J 3/46* (2013.01); *H02J 2003/001* (2013.01); *H02J 2003/003* (2013.01); *H02J 2003/007* (2013.01); *Y02E 40/72* (2013.01); *Y04S 10/12* (2013.01)

(58) Field of Classification Search
CPC .... G05B 15/02; H02J 2003/003; H02J 3/381; H02J 3/46; H02J 2003/007
USPC ....................................................... 700/287
See application file for complete search history.

(56) References Cited

U.S. PATENT DOCUMENTS

| | | | | |
|---|---|---|---|---|
| 7,660,649 | B1 * | 2/2010 | Hope ...................... | G06Q 10/04 700/28 |
| 8,860,358 | B2 * | 10/2014 | Bettenwort ............... | G05F 1/67 307/80 |
| 8,983,666 | B2 * | 3/2015 | Currie ..................... | H02J 3/005 700/277 |
| 9,870,593 | B2 * | 1/2018 | Sedighy ................. | G06Q 50/06 |

(Continued)

*Primary Examiner* — Chun Cao
(74) *Attorney, Agent, or Firm* — Hodgson Russ LLP (57) ABSTRACT

The present disclosure provides a method and a device for controlling a distributed generator in a distribution system. The method includes: extracting a first statistic feature of a load at each bus; extracting a second statistic feature of a distributed generator at each bus; establishing a probability distribution set of each first and second statistic feature; determining security constraints of the distribution system; obtaining a bilinear matrix inequality constraint by using a C-VaR approximation algorithm and a duality algorithm based on the probability distribution set and on the security constraints; determining an objective function to maximize a total installed capacity of the distributed generators; solving the objective function according to the bilinear matrix inequality constraint to obtain an installed capacity of each distributed generator; and controlling an access of each distributed generator according to the installed capacity. The method may take full use of statistic features and has higher practicability.

20 Claims, 2 Drawing Sheets

(56) References Cited

U.S. PATENT DOCUMENTS

| | | | | |
|---|---|---|---|---|
| 2001/0021896 A1* | 9/2001 | Bertsch | .................... | H02J 3/24 |
| | | | | 702/62 |
| 2011/0172835 A1* | 7/2011 | Imes | .................... | G06Q 50/06 |
| | | | | 700/287 |
| 2017/0324243 A1* | 11/2017 | Ghosh | ................... | H02J 3/14 |

* cited by examiner

METHOD AND DEVICE FOR CONTROLLING DISTRIBUTED GENERATOR IN DISTRIBUTION SYSTEM

CROSS-REFERENCE TO RELATED APPLICATIONS

This application is based upon and claims a priority to Chinese Patent Application Serial No. 201610618112.2, filed with the State Intellectual Property Office of P. R. China on Jul. 29, 2016, the entire contents of which are incorporated herein by reference.

FIELD

The present disclosure generally relates to the field of electric power system, and more particularly, to a method and a device for controlling a distributed generator in a distribution system.

BACKGROUND

In order to solve technical problems resulted from an access to a power grid by distributed generators (especially photovoltaic generators), it needs to estimate a maximum capacity in the power grid to determine an optimum power capacity and a distribution of the distributed generators, so as to control the access of the distributed generators and to realize a maximum penetration of the distributed generators. However, as outputs of the distributed generators may be influenced by a weather and environment condition, the outputs may have a significant fluctuation and intermittence. Thus, a predicted output may be not precise in the prior art. Furthermore, it is unable to predict precisely a bus load of the power grid. Therefore, errors of the output and the bus load may cause an uncertainty for estimating a distributed power capacity.

The uncertainty is neglected in the prior art. In addition, a predicted output and a predicted bus load are employed to estimate the distributed power capacity in the prior art. In such a case, the uncertainty is not considered in estimation of the distributed power capacity, which may control the access of the distributed generators with wrong.

SUMMARY

A method for controlling a distributed generator in a distribution system is provided in embodiments of the present disclosure. The distribution system includes a plurality of buses, a plurality of feeder terminal units and a dispatching center, each feeder terminal unit is configured to monitor load data at each bus and to send the load data to the dispatching center, the dispatching center includes one or more computing devices, and the method includes:

extracting, by the one or more computing devices, a first statistic feature of a load at each bus according to the load data;

extracting, by the one or more computing devices, a second statistic feature of a distributed generator at each bus according to historical data;

establishing, by the one or more computing devices, a probability distribution set of each first statistic feature and each second statistic feature;

determining, by the one or more computing devices, one or more security constraints of distribution system;

obtaining, by the one or more computing devices, a bilinear matrix inequality constraint by using a Conditional Value at Risk C-VaR, approximation algorithm and a duality algorithm based on the probability distribution set and on the one or more security constraints;

determining, by the one or more computing devices, an objective function to maximize a total installed capacity of the distributed generators;

solving, by the one or more computing devices, the objective function according to the bilinear matrix inequality constraint to obtain an installed capacity of each distributed generator; and controlling, by the one or more computing devices, an access of each distributed generator according to the installed capacity.

A device for controlling a distributed generator in a distribution system is provided in embodiments of the present disclosure. The device is included on the distribution system, and the distribution system further includes a plurality of buses and a plurality of feeder terminal units, each feeder terminal unit is configured to monitor load data of each bus and to send the load data to the device, and the device includes:

one or more computing devices; and a memory, storing an instruction executable by the one or more computing devices;

in which the one or more computing devices are configured to:

extract a first statistic feature of a load at each bus according to the load data;

extract a second statistic feature of a distributed generator at each bus according to historical data;

establish a probability distribution set of each first statistic feature and each second statistic feature:

determine one or more security constraints for operating safely of the distribution system; obtain a bilinear matrix inequality constraint by using a C-VaR approximation algorithm and a duality algorithm based on the probability distribution set and on the one or more security constraints;

determine an objective function to maximize a total installed capacity of the distributed generators;

solve the objective function according to the bilinear matrix inequality constraint to obtain an installed capacity of each distributed generator; and control an access of each distributed generator according to the installed capacity.

A non-transitory computer storage memory medium is provided in a second aspect of embodiments of the present disclosure. The non-transitory computer storage memory medium has one or more modules stored therein. The one or more modules are caused to perform the method including:

extracting a first statistic feature of a load at each bus according to the load data;

extracting a second statistic feature of a distributed generator at each bus according to historical data;

establishing a probability distribution set of each first statistic feature and each second statistic feature;

determining one or more security constraints of the distribution system;

obtaining a bilinear matrix inequality constraint by using a Conditional Value at Risk C-VaR approximation algorithm and a duality algorithm based on the probability distribution set and on the one or more security constraints;

determining an objective function to maximize a total installed capacity of the distributed generators;

solving the objective function according to the bilinear matrix inequality constraint to obtain an installed capacity of each distributed generator; and controlling an access of each distributed generator according to the installed capacity.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

In the description of the present disclosure, "a plurality of" means two or more than two, unless specified otherwise.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

Figure 1:
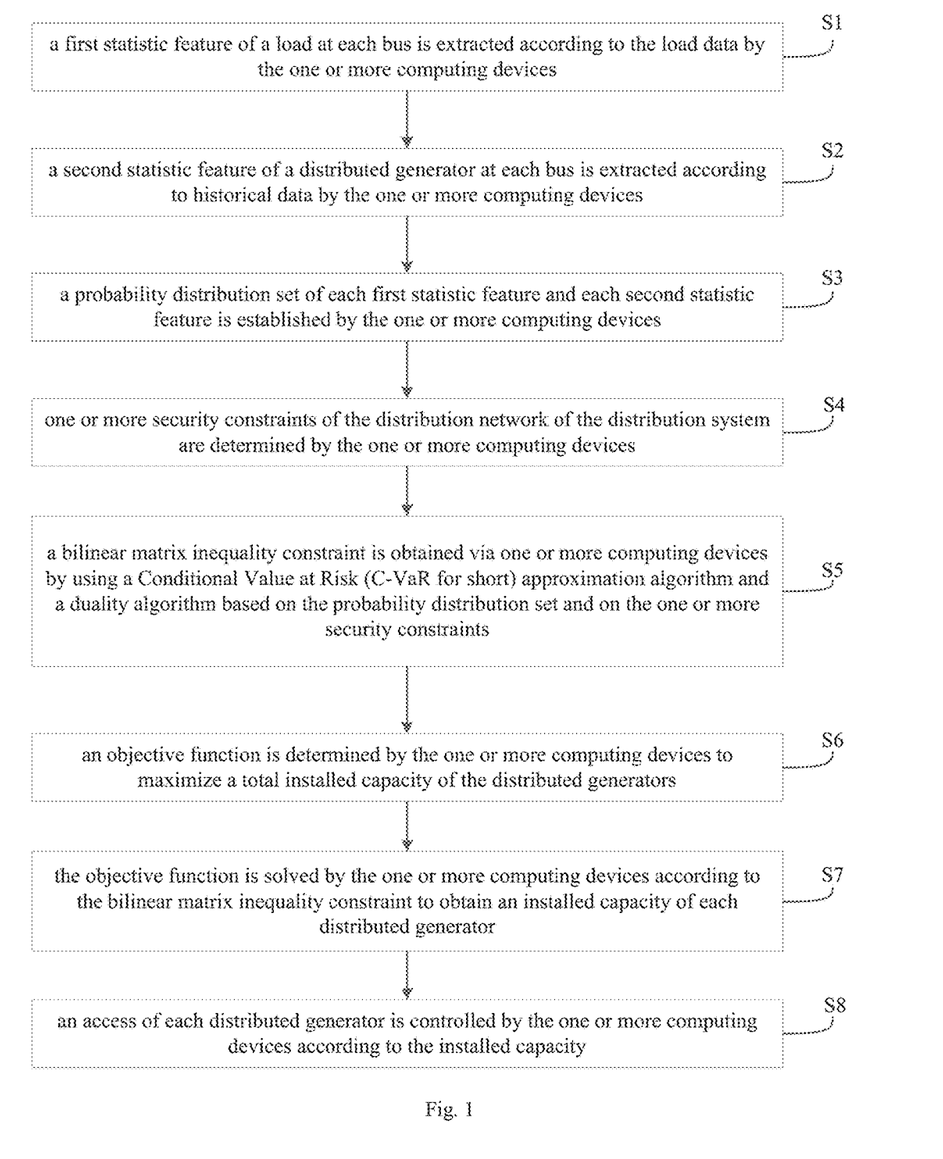
FIG. 1 is a flow chart showing a method for controlling a distributed generator in a distribution system according to an embodiment.

FIG. 1 is a flow chart showing a method for controlling a distributed generator in a distribution system according to an embodiment. The distribution system includes a plurality of buses, a plurality of feeder terminal units and a dispatching center. Each feeder terminal unit is configured to monitor load data at each bus and to send the load data to the dispatching center. The dispatching center includes one or more computing devices. As shown in FIG. 1, the method includes followings.

At step S1, a first statistic feature of a load at each bus is extracted according to the load data by the one or more computing devices.

At step S2, a second statistic feature of a distributed generator at each bus is extracted according to historical data by the one or more computing devices.

In an embodiment, the first statistic feature of the load is an uncertainty variable of t e load. And the first statistic feature of the load at a bus i during a period t is denoted as $\xi_{i,t}^{L}$.

In an embodiment, the second statistic feature of the distributed generator is an uncertainty variable of the distributed generator. And the second statistic feature of the distributed generator at the bus i during the period t is denoted as $\xi_{i,t}^{DG}$.

In an embodiment, the historical data is a historical meteorological condition, and the uncertainty variable of the distributed generator is determined according to the historical meteorological condition.

In an embodiment, the uncertainty variable of the load and the uncertainty variable of the distributed generator together form an uncertainty vector denoted as $\xi$, from which a mean vector $\mu$ and a variance matrix $\Sigma$ can be created. The mean vector $\mu$ includes means of the uncertainty variables of the loads at all buses and mean variables of the uncertainty variables of the distributed generators at all buses. The variance matrix $\Sigma$ includes covariances and self-variances of the uncertainty variables of the loads at all buses and variances and self-variances of the uncertainty variables of the distributed generators at all buses.

Since the statistic features of the uncertainty variables at the buses are obtained according to the monitored data, the method may take full use of statistic features, which has a higher practicability.

At step S3, a probability distribution set of each first statistic feature and each second statistic feature is established by the one or more computing devices.

In an embodiment, the probability distribution set is established based on the mean vector $\mu$ and the variance matrix $\Sigma$ and is denoted by a formula of:

$$\Pi(\mu, \Sigma) = \left\{ F(\xi) \middle| \begin{array}{l} \int dF(\xi) = 1 \\ \int \xi dF(\xi) = \mu \\ \int \xi \xi^T dF(\xi) = \Sigma + \mu\mu^T \end{array} \right\}$$

where, $F(\xi)$ is a probability distribution function; $\Pi(\mu, \Sigma)$ is the probability distribution set including a probability distribution of the uncertainty vector $\xi$ with the mean vector $\mu$ and the variance matrix $\Sigma$.

At step S4, one or more security constraints of the distribution network of the distribution system are determined by the one or more computing devices.

The one or more security constraints include an output of each load, an output of each distributed generator, an output constraint of each distributed generator, a power balance constraint at each bus, a power flow constraint, a power capacity constraint of each branch and a voltage security constraint of each bus.

In an embodiment, the output of each load represents the output of the load at each bus, which is denoted by a formula of:

$$\begin{cases} \tilde{P}_{i,t}^{L} = \overline{P}_{i,t}^{L} \cdot (1 + \xi_{i,t}^{L}) \\ \tilde{Q}_{i,t}^{L} = (\overline{Q}_{i,t}^{L} / \overline{P}_{i,t}^{L}) \cdot \tilde{P}_{i,t}^{L}; \\ \forall i \in \Psi_n, t \in \Gamma \end{cases}$$

In an embodiment, the output of each distributed generator represents the output of the distributed generator at each bus, which is determined by a formula of:

$$\begin{cases} \tilde{P}_{i,t}^{DG} = \overline{P}_{i,t}^{DG} \cdot (1 + \xi_{i,t}^{DG}) \\ \tilde{Q}_{i,t}^{DG} = \eta_{i,t} \cdot \tilde{P}_{i,t}^{DG} \\ \forall\, i \in \Psi_{DG},\, t \in \Gamma \end{cases};$$

where, i denotes a serial number of the buses; t denotes a period; $\overline{P}_{i,t}^{L}$ is a predicted active power of the load at a bus i during a period t; $\overline{Q}_{i,t}^{L}$ is a predicted reactive power of the load at the bus i during the period t; $\tilde{P}_{i,t}^{L}$ is an uncertainty active power of the load at the bus i during the period t; $\tilde{Q}_{i,t}^{L}$ is an uncertainty reactive power of the load at the bus i during the period t; $\xi_{i,t}^{L}$ is an uncertainty variable of the load at the bus i during the period t; $\overline{P}_{i,t}^{DG}$ is a predicted active power of the distributed generator at the bus i during the period t; $\tilde{P}_{i,t}^{DG}$ is an uncertainty active power of the distributed generator at the bus i during the period t; $\tilde{Q}_{i,t}^{DG}$ is an uncertainty reactive power of the distributed generator at the bus i during the period t; $\xi_{i,t}^{DG}$ is an uncertainty variable of the distributed generator at the bus i during the period t; $\eta_{i,t}$ is a power factor of the distributed generator at the bus i during the period t; $\Psi_{DG}$ is a set of all distributed generators; and $\Gamma$ is a set of periods for estimating the installed capacity.

In an embodiment, the output constraint of each distributed generator represents the output constraint of the distributed generator at each bus, which is determined by a formula of:

$$\begin{cases} \overline{P}_{i,t}^{DG} = \overline{w}_{i,t} \cdot S_i \\ \forall\, i \in \Psi_{DG},\, t \in \Gamma \end{cases}$$

where, $\overline{w}_{i,t}$ is a predicted output coefficient of the distributed generator at the bus i during the period t; $S_i$ is an installed capacity variable of the distributed generator at the bus i, which is non-negative.

In an embodiment, the power balance constraint at each bus is determined by a formula of:

$$\begin{cases} \tilde{P}_{i,t}^{DG} = \tilde{P}_{i,t}^{L} = \sum_{j \in i} p_{ij,t} \\ \tilde{Q}_{i,t}^{DG} = \tilde{Q}_{i,t}^{L} = \sum_{j \in i} q_{ij,t} \\ \forall\, i \in \Psi_n,\, t \in \Gamma \end{cases}$$

where, j denotes a serial number of bus j directly connected with bus i; $p_{ij,t}$ is an active power variable of a branch ij from the bus i to the bus j during the period t; $q_{ij,t}$ is a reactive power variable of the branch ij from the bus i to the bus j during the period t.

In an embodiment, the power flow constraint is determined by a formula of:

$$\begin{cases} U_{i,t} = V_{i,t}^2 \\ U_{i,t} - U_{j,t} = 2(r_{ij} \cdot p_{ij,t} + x_{ij} \cdot q_{ij,t}) \\ \forall\, (ij) \in \Phi_b,\, t \in \Gamma \end{cases}$$

where, $U_{i,t}$ is a voltage amplitude square variable at the bus i during the period t; $V_{i,t}$ is a voltage amplitude variable at the bus i during the period t; $U_{j,t}$ is a voltage amplitude square variable at the bus j during the period t; $r_{ij}$ is a known resistor value of a branch ij; $x_{ij}$ is a known reactance value of the branch ij; $p_{ij,t}$ is an active power variable of the branch ij from the bus i to the bus j during the period t; $q_{ij,t}$ is a reactive power Variable of the branch ij from the bus i to the bus j during the period t.

In an embodiment, the power capacity constraint of each branch is determined by a formula of:

$$\begin{cases} -s_{ij,max} \leq p_{ij,t} \leq s_{ij,max} \\ -s_{ij,max} \leq q_{ij,t} \leq s_{ij,max} \\ -\sqrt{2} \cdot s_{ij,max} \leq p_{ij,t} + q_{ij,t} \leq \sqrt{2} \cdot s_{ij,max} \\ -\sqrt{2} \cdot s_{ij,max} \leq p_{ij,t} - q_{ij,t} \leq \sqrt{2} \cdot s_{ij,max} \\ \forall\, (ij) \in \Phi_b,\, t \in \Gamma \end{cases}$$

where, $\Phi_b$ is a set of all branches; $s_{ij,max}$ is an upper limit of a power value of the branch ij.

In an embodiment, the voltage security constraint at each bus is determined by a formula of:

$$\begin{cases} U_{i,min} \leq U_{i,t} \leq U_{i,max} \\ \forall\, i \in \Psi_n,\, t \in \Gamma \end{cases}$$

where, $U_{i,min}$ is a lower limit value of a voltage amplitude square at the bus i; $U_{i,max}$ is an upper limit of the voltage amplitude square at the bus i; $U_{i,t}$ is a variable of the voltage amplitude square at the bus i during the period t.

At step S5, a bilinear matrix inequality constraint is obtained via one or more computing devices by using a Conditional Value at Risk (C-VaR for short) approximation algorithm and a duality algorithm based on the probability distribution set and on the one or more security constraints.

In an embodiment, the power capacity constraint of each branch and the voltage security constraint of each bus are rewritten as a distributed robust opportunity constraint according to the output of each load, the output of each distributed generator, the output constraint of each distributed generator, the power balance constraint at each bus and the power flow constraint. Then, the bilinear matrix inequality constraint is obtained by using the C-VaR approximation algorithm and the duality algorithm based on the probability distribution set and on the distributed robust opportunity constraint.

In an embodiment, the distributed robust opportunity constraint is denoted by a formula of:

$$\inf_{F(\xi) \in \Pi(\mu, \Sigma)} \left[ \Pr_{\xi \sim F(\xi)} \left( \begin{array}{l} z_k^0(x) + z_k(x)^T \xi \leq 0 \\ \forall\, k = 1, \cdots, K \end{array} \right) \right] \geq 1 - \delta \quad (1)$$

where, x is a decision vector in which a component is an installed capacity variable of the distributed generator of each bus; K is the number of constraints comprised in the one or more security constraints; $z_k^0(x)$ is $k^{th}$ function regarding to a decision vector x; $z_k(x)$ is $k^{th}$ function vector regarding to the decision vector x;

$$\Pr_{\xi \sim F(\xi)}(\cdot)$$

is a probability of the uncertainty vector $\xi$ following a probability distribution; $\delta$ is a coefficient ranging from 0 to 1.

In an embodiment, $\delta$ is a predetermined risk level and a typical value of $\delta$ equals to 0.1.

In an embodiment, according to the output of each load, the output of each distributed generator, the output constraint of each distributed generator, the power balance constraint at each bus and the power flow constraint, all flow variables, such as $p_{ij,t}$, $q_{ij,t}$ and $U_{i,t}$, are reformulated as a function of the decision vector x and the uncertainty vector $\xi$. Then, the power capacity constraint of each branch and the voltage security constraint of each bus are rewritten as a distributed robust opportunity constraint.

In an embodiment, the in equation (1) means that a probability of the one or more security constraints is equal to or greater than 1−δ even in a worst-case probability distributed function in the probability distributed set.

In an embodiment, the bilinear matrix inequality constraint is denoted by a formula of:

$$\begin{cases} Y = \begin{bmatrix} \Sigma + \mu\mu^T & \mu \\ \mu & 1 \end{bmatrix}, \beta + \frac{1}{\delta} \cdot Tr\langle Y, Q \rangle \leq 0 \\ Q - \begin{bmatrix} 0 & \frac{1}{2}\lambda_k z_k(x) \\ \frac{1}{2}\lambda_k z_k(x)^T & \lambda_k z_k^0(x) - \beta \end{bmatrix} \geq 0 \\ Q \geq 0; \forall k = 1, \cdots, K \\ \beta \in R, Q \in R^{(n+1)\times(n+1)} \end{cases}$$

where, $\beta$ is a middle variable; Y is a known matrix; Q is a symmetric matrix vector composed of dual variables; Tr $\langle Y,Q \rangle$ is a multiplex operation on the known matrix Y and the symmetric matrix vector Q; and $\lambda_k$ is a non-negative factor variable.

At step S6, an objective function is determined by the one or more computing devices to maximize a total installed capacity of the distributed generators.

In an embodiment, the objective function is denoted by a formula of $$\max_{s_i \geq 0} \sum_{i \in \Psi_{DG}} S_i$$

where, $S_i$ is an installed capacity variable of the distributed generator at bus i, which is non-negative.

At step S7, the objective function is solved by the one or more computing devices according to the bilinear matrix inequality constraint to obtain an installed capacity of each distributed generator.

In an embodiment, a sequential convex optimization is applied on objective function based on the bilinear matrix inequality constraint.

In an embodiment, a result by solving the objective function is the power capacity estimation in the distribution system.

At step S8, an access of each distributed generator is controlled by the one or more computing devices according to the installed capacity.

With the method, by extracting the first statistic feature of the load at each bus according to the load data and by extracting the second statistic feature of the distributed generator at each bus according to historical data, uncertainties of predicted outputs and predicted loads are considered and the power capacity is based on a data-driven model; by establishing the probability distribution set of each first statistic feature and each second statistic feature, detailed probability distribution function are not required and the power capacity estimation is neither robust nor conservative; by determining the objective function and by solving the objective function according to the bilinear matrix inequality constraint to obtain the installed capacity of each distributed generator, the power capacity estimated is more approximate to a real fact; by controlling the access of each distributed generator, a size and location of each distributed generator may be determined reasonably.

Figure 2:
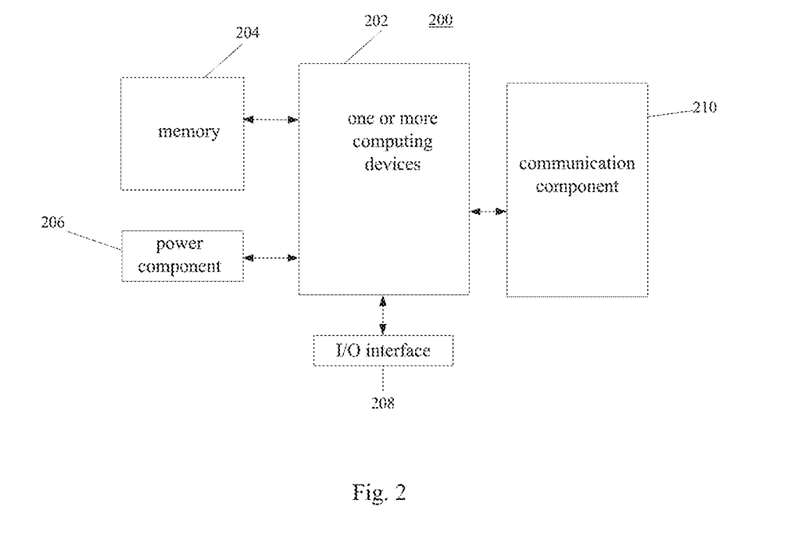
FIG. 2 is a schematic diagram illustrating a device for controlling a distributed generator in a distribution system according to an embodiment.

FIG. 2 is a schematic diagram illustrating a device 200 for controlling a distributed generator in a distribution system network according to an embodiment. The device is included on the distribution system. The distribution system further includes a plurality of buses and a plurality of feeder terminal units. Each feeder terminal unit is configured to monitor load data of each bus and to send the load data to the device 200.

Referring to FIG. 2, the device 200 may include one or more computing devices 202, a memory 204, a power component 206, an Input/Output (I/O) interface 208, and a communication component 210.

The one or more computing devices 202 may execute instructions to perform all or part of the steps in the above described methods. The memory 204 is configured to an instruction executable by the one or more computing devices 202. The power component 206 provides power to various components of the device 200. The I/O interface 208 provides an interface for the one or more computing devices 202 and peripheral interface modules, such as a keyboard.

In exemplary embodiments, there is also provided a non-transitory computer readable storage medium including instructions, such as the memory 204 including instructions. The above instructions are executable by the computing devices 202 in the device 200, for performing the above-described methods.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

In the description, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above terms in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling distributed generators in a distribution system, wherein the distribution system comprises a plurality of buses, a plurality of feeder terminal units and a dispatching center, each feeder terminal unit is configured to monitor load data of each bus and to send the load data to the dispatching center, the dispatching center comprises one or more computing devices, and the method comprises:

extracting, by the one or more computing devices, a first statistic feature of a load at each bus according to the load data;

extracting, by the one or more computing devices, a second statistic feature of a distributed generator of the distributed generators at each bus according to historical data;

establishing, by the one or more computing devices, a probability distribution set of each first statistic feature and each second statistic feature;

determining, by the one or more computing devices, one or more security constraints of the distribution system;

obtaining, by the one or more computing devices, a bilinear matrix inequality constraint by using a Conditional Value at Risk C-VaR approximation algorithm and a duality algorithm based on the probability distribution set and on the one or more security constraints;

determining, by the one or more computing devices, an objective function to maximize a total installed capacity of the distributed generators;

solving, by the one or more computing devices, the objective function according to the bilinear matrix inequality constraint to obtain an installed capacity of each distributed generator; and controlling, by the one or more computing devices, an access of each distributed generator according to the installed capacity such that power output of at least one of the distributed generators is provided to the distribution system based on the objective function.

2. The method according to claim 1, wherein obtaining, by the one or more computing devices, a bilinear matrix inequality constraint by using a C-VaR approximation algorithm and a duality algorithm based on the probability distribution set and on the one or more security constraints comprises:

determining, by the one or more computing devices, an output of each load, an output of each distributed generator, an output constraint of each distributed generator, a power balance constraint at each bus, a power flow constraint, a power capacity constraint of each branch and a voltage security constraint of each bus;

rewriting, by the one or more computing devices, the power capacity constraint of each branch and the voltage security constraint of each bus as a distributed robust opportunity constraint according to the output of each load, the output of each distributed generator, the output constraint of each distributed generator, the power balance constraint at each bus and the power flow constraint; and obtaining, by the one or more computing devices, the bilinear matrix inequality constraint by using the C-VaR approximation algorithm and the duality algorithm based on the probability distribution set and on the distributed robust opportunity constraint.

3. The method according to claim 1, wherein the first statistic feature of each load comprises a mean and a variance of an uncertainty variable of each load, the second statistic feature of each distributed generator comprises a mean and a variance of an uncertainty variable of each distributed generator, and the probability distribution set is denoted by a formula of:

$$\Pi(\mu, \Sigma) = \left\{ F(\xi) \left| \begin{array}{l} \int dF(\xi) = 1 \\ \int \xi dF(\xi) = \mu \\ \int \xi \xi^T dF(\xi) = \Sigma + \mu \mu^T \end{array} \right. \right\}$$

where, ξ is an uncertainty vector comprising the uncertainty variable of each bus and the uncertainty variable of each distributed generator, μ is a mean vector comprising the mean of the uncertainty variable of each load and the mean of the uncertainty variable of each distributed generator; Σ is a variance matrix comprising a covariance and a self-variance of the uncertainty variable of each load and a covariance and a self-variance of the uncertainty variable of each distributed generator; F(ξ) is a probability distribution function; Π(μ, Σ) is the probability distribution set comprising a probability distribution of the uncertainty vector ξ with the mean vector μ and the variance matrix Σ.

4. The method according to claim 2, wherein the output of each load is denoted by a formula of:

$$\begin{cases} \tilde{P}_{i,t}^L = \overline{P}_{i,t}^L \cdot (1 + \xi_{i,t}^L) \\ \tilde{Q}_{i,t}^L = (\overline{Q}_{i,t}^L / \overline{P}_{i,t}^L) \cdot \tilde{P}_{i,t}^L \\ \forall\, i \in \Psi_n, t \in \Gamma \end{cases}$$

where, i denotes a serial number of the buses; t denotes a period; $\overline{P}_{i,t}^L$ is a predicted active power of the load at a bus i during a period t; $\overline{Q}_{i,t}^L$ is a predicted reactive power of the load at the bus i during the period t; $\tilde{P}_{i,t}^L$ is an uncertainty active power of the load at the bus i during the period t; $\tilde{Q}_{i,t}^L$ is an uncertainty reactive power of the load at the bus i during the period t; $\xi_{i,t}^L$ is an uncertainty variable of the load at the bus i during the period t; $\Psi_n$ is a set of all buses; and Γ is a set of periods for estimating the installed capacity.

5. The method according to claim 2, wherein the output of each distributed generator is denoted by a formula of:

$$\begin{cases} \tilde{P}_{i,t}^{DG} = \overline{P}_{i,t}^{DG} \cdot (1 + \xi_{i,t}^{DG}) \\ \tilde{Q}_{i,t}^{DG} = \eta_{i,t} \cdot \tilde{P}_{i,t}^{DG} \\ \forall\, i \in \Psi_{DG}, t \in \Gamma \end{cases}$$

where, i denotes a serial number of the buses; t denotes a period; $\overline{P}_{i,t}^{DG}$ is a predicted active power of the distributed generator at a bus i during a period t; $\tilde{P}_{i,t}^{DG}$ is an uncertainty active power of the distributed generator at the bus i during the period t; $\tilde{Q}_{i,t}^{DG}$ is an uncertainty reactive power of the distributed generator at the bus i during the period t; $\xi_{i,t}^{DG}$ is an uncertainty variable of the distributed generator at the bus i during the period t; $\eta_{i,t}$ is a power factor of the distributed generator at the bus i during the period t; $\Psi_{DG}$ is a set of all distributed generators; and Γ is a set of periods for estimating the installed capacity.

6. The method according to claim 2, wherein the output constraint of each distributed generator is denoted by a formula of:

$$\begin{cases} \overline{P}_{i,t}^{DG} = \overline{w}_{i,t} \cdot S_i \\ \forall\, i \in \Psi_{DG}, t \in \Gamma \end{cases}$$

where, i denotes a serial number of the buses; t denotes a period; $\overline{P}_{i,t}^{DG}$ is a predicted active power of the distributed generator at a bus i during a period t; $\overline{w}_{i,t}$ is a predicted output coefficient of the distributed generator at the bus i during the period t; $S_i$ is an installed capacity variable of the distributed generator at the bus i, which is non-negative;

$\Psi_{DG}$ is a set of all distributed generators; and Γ is a set of periods for estimating the installed capacity.

7. The method according to claim 2, wherein the power balance constraint at each bus is denoted by a formula of:

$$\begin{cases} \tilde{P}_{i,t}^{DG} - \tilde{P}_{i,t}^L = \sum_{j \in i} p_{ij,t} \\ \tilde{Q}_{i,t}^{DG} - \tilde{Q}_{i,t}^L = \sum_{j \in i} q_{ij,t} \\ \forall\, i \in \Psi_n, t \in \Gamma \end{cases}$$

where, i denotes a serial number of the buses; t denotes a period; j denotes a serial number of a bus j directly connected with a bus i; $\tilde{P}_{i,t}^L$ is an uncertainty active power of the load at the bus i during the period t; $\tilde{P}_{i,t}^{DG}$ is an uncertainty active power of the distributed generator at the bus i during the period t; $\tilde{Q}_{i,t}^L$ is an uncertainty reactive power of the load at the bus i during the period t; $\tilde{Q}_{i,t}^{DG}$ is an uncertainty reactive power of the distributed generator at the bus i during the period t; $p_{ij,t}$ is an active power variable of a branch ij from the bus i to the bus j during the period t; $q_{ij,t}$ is a reactive power variable of the branch ij from the bus i to the bus j during the period t; $\Psi_n$ is a set of all buses; and Γ is a set of periods for estimating the installed capacity.

8. The method according to claim 2, wherein the power flow constraint is denoted by a formula of:

$$\begin{cases} U_{i,t} = V_{i,t}^2 \\ U_{i,t} - U_{j,t} = 2(r_{ij} \cdot p_{ij,t} + x_{ij} \cdot q_{ij,t}) \\ \forall\, (ij) \in \Phi_b, t \in T \end{cases}$$

where, i denotes a serial number of the buses; t denotes a period; j denotes a serial number of a bus j directly connected with a bus i; $U_{i,t}$ is a voltage amplitude square variable at the bus i during the period t; $V_{i,t}$ is a voltage amplitude variable at the bus i during the period t; $U_{j,t}$ is a voltage amplitude square variable at the bus j during the period t; $r_{ij}$ is a known resistor value of a branch ij; $x_{ij}$ is a known reactance value of the branch ij; $p_{ij,t}$ is an active power variable of the branch ij from the bus i to the bus j during the period t; $q_{ij,t}$ is a reactive power variable of the branch ij from the bus i to the bus j during the period t; $\Psi_n$ is a set of all buses; and Γ is a set of periods for estimating the installed capacity.

9. The method according to claim 2, wherein the power capacity constraint of each branch is denoted by a formula of:

$$\begin{cases} -s_{ij,max} \leq p_{ij,t} \leq s_{ij,max} \\ -s_{ij,max} \leq q_{ij,t} \leq s_{ij,max} \\ -\sqrt{2} \cdot s_{ij,max} \leq p_{ij,t} + q_{ij,t} \leq \sqrt{2} \cdot s_{ij,max} \\ -\sqrt{2} \cdot s_{ij,max} \leq p_{ij,t} - q_{ij,t} \leq \sqrt{2} \cdot s_{ij,max} \\ \forall\, (ij) \in \Phi_b, t \in \Gamma \end{cases}$$

where, i denotes a serial number of buses; t denotes a period; j denotes a serial number of a bus j directly connected with a bus i; $\Phi_b$ is a set of all branches; $p_{ij,t}$ is an active power variable of a branch ij from the bus i to the bus j during a period t; $q_{ij,t}$ is a reactive power variable of the branch ij from the bus i to the bus j during the period t; $s_{ij,max}$ is an upper limit of a power value of the branch ij; and $\Gamma$ is a set of periods for estimating the installed capacity.

10. The method according to claim 2, wherein the voltage security constraint at each bus is denoted by a formula of:

$$\begin{cases} U_{i,min} \leq U_{i,t} \leq U_{i,max} \\ \forall i \in \Psi_n, t \in \Gamma \end{cases}$$

where, i denotes a serial number of the buses; t denotes a period; $U_{i,min}$ is a lower limit value of a voltage amplitude square at a bus i; $U_{i,max}$ is an upper limit of the voltage amplitude square at the bus i; $U_{i,t}$ is a variable of the voltage amplitude square at the bus i during the period t; $\Psi_n$ is a set of all buses; and $\Gamma$ is a set of periods for estimating the installed capacity.

11. The method according to claim 3, wherein the distributed robust opportunity constraint is denoted by a formula of:

$$\inf_{F(\xi) \in \Pi(\mu, \Sigma)} \left[ \Pr_{\xi \sim F(\xi)} \left( \begin{cases} z_k^0(x) + z_k(x)^T \xi \leq 0 \\ \forall k = 1, \ldots, k \end{cases} \right) \right] \geq 1 - \delta$$

where, x is a decision vector in which a component is an installed capacity variable of the distributed generator of each bus; K is the number of constraints comprised in the one or more security constraints; $z_k^0(x)$ is $k^{th}$ function regarding to a decision vector x; $z_k(x)$ is $k^{th}$ function vector regarding to the decision vector x;

$$\Pr_{\xi \sim F(\xi)}(\cdot)$$

is a probability of the uncertainty vector $\xi$ following a probability distribution; $\delta$ is a coefficient ranging from 0 to 1.

12. The method according to claim 11, wherein the bilinear matrix inequality constraint is denoted by a formula of:

$$\begin{cases} Y = \begin{bmatrix} \Sigma + \mu\mu^T & \mu \\ \mu & 1 \end{bmatrix}, \beta + \frac{1}{\delta} \cdot Tr\langle Y, Q\rangle \leq 0 \\ Q - \begin{bmatrix} 0 & \frac{1}{2}\lambda_k z_k(x) \\ \frac{1}{2}\lambda_k z_k(x)^T & \lambda_k z_k^0(x) - \beta \end{bmatrix} \geq 0 \\ Q \geq 0; \forall k = 1, \ldots, K \\ \beta \in R, Q \in R^{(n+1)\times(n+1)} \end{cases}$$

where, $\beta$ is a middle variable; Y is a known matrix; Q is a symmetric matrix vector composed of dual variables; Tr<Y, Q> is a multiplex operation on the known matrix Y and the symmetric matrix vector Q; and $\lambda_k$ is a non-negative factor variable.

13. The method according to claim 1, wherein the objective function is denoted by a formula of:

$$\max_{s_i \geq 0} \sum_{i \in \Psi_{DG}} S_i$$

where, i denotes a serial number of the buses, $S_i$ is an installed capacity variable of the distributed generator at a bus i, which is non-negative; and $\psi_{DG}$ is a set of all distributed generators.

14. The method according to claim 1, wherein solving, by the one or more computing devices, the objective function according to the bilinear matrix inequality constraint, comprises:
applying, by the one or more computing devices, a sequential convex optimization on the objective function based on the bilinear matrix inequality constraint.

15. A device for controlling distributed generators in a distribution system, wherein the device is comprised on the distribution system, the distribution system further comprises a plurality of buses and a plurality of feeder terminal units, each feeder terminal unit is configured to monitor load data of each bus and to send the load data to the device, and the device comprises:
one or more computing devices; and
a memory, storing an instruction executable by the one or more computing devices;
wherein the one or more computing devices are configured to:
extract a first statistic feature of a load at each bus according to the load data;
extract a second statistic feature of a distributed generator of the distributed generators at each bus according to historical data;
establish a probability distribution set of each first statistic feature and each second statistic feature;
determine one or more security constraints of the distribution system;
obtain a bilinear matrix inequality constraint by using a Conditional Value at Risk C-VaR approximation algorithm and a duality algorithm based on the probability distribution set and on the one or more security constraints;
determine an objective function to maximize a total installed capacity of the distributed generators;
solve the objective function according to the bilinear matrix inequality constraint to obtain an installed capacity of each distributed generator; and
control an access of each distributed generator according to the installed capacity such that power output of at least one of the distributed generators is provided to the distribution system based on the objective function.

16. A non-transitory computer storage memory medium, having one or more software modules stored therein, wherein the one or more modules are caused to perform a method for controlling distributed generators in a distribution system, wherein the distribution system comprises a plurality of buses, a plurality of feeder terminal units and a dispatching center; each feeder terminal unit is configured to monitor load data of each bus and to send the load data to the dispatching center, the method comprising:
extracting a first statistic feature of a load at each bus according to the load data;
extracting a second statistic feature of a distributed generator of the distributed generators at each bus according to historical data;
establishing a probability distribution set of each first statistic feature and each second statistic feature;
determining one or more security constraints of the distribution system;
obtaining a bilinear matrix inequality constraint by using a Conditional Value at Risk C-VaR approximation algorithm and a duality algorithm based on the probability distribution set and on the one or more security constraints;
determining an objective function to maximize a total installed capacity of the distributed generators;
solving the objective function according to the bilinear matrix inequality constraint to obtain an installed capacity of each distributed generator; and
controlling an access of each distributed generator according to the installed capacity such that power output of at least one of the distributed generators is provided to the distribution system based on the objective function.

17. The non-transitory computer storage memory medium according to claim 16, wherein obtaining a bilinear matrix inequality constraint by using a C-VaR approximation algorithm and a duality algorithm based on the probability distribution set and on the one or more security constraints comprises:
determining an output of each load, an output of each distributed generator, an output constraint of each distributed generator, a power balance constraint at each bus, a power flow constraint, a power capacity constraint of each branch and a voltage security constraint of each bus;
rewriting the power capacity constraint of each branch and the voltage security constraint of each bus as a distributed robust opportunity constraint according to the output of each load, the output of each distributed generator, the output constraint of each distributed generator, the power balance constraint at each bus and the power flow constraint; and
obtaining the bilinear matrix inequality constraint by using the C-VaR approximation algorithm and the duality algorithm based on the probability distribution set and on the distributed robust opportunity constraint.

18. The non-transitory computer storage memory medium according to claim 16, wherein the first statistic feature of each load comprises a mean and a variance of an uncertainty variable of each load, the second statistic feature of each distributed generator comprises a mean and a variance of an uncertainty variable of each distributed generator, and the probability distribution set is denoted by a formula of:

$$\Pi(\mu, \Sigma) = \left\{ F(\xi) \middle| \begin{array}{l} \int dF(\xi) = 1 \\ \int \xi dF(\xi) = \mu \\ \int \xi \xi^T dF(\xi) = \Sigma + \mu \mu^T \end{array} \right\}$$

where, $\xi$ is an uncertainty vector comprising the uncertainty variable of each bus and the uncertainty variable of each distributed generator, $\mu$ is a mean vector comprising the mean of the uncertainty variable of each load and the mean of the uncertainty variable of each distributed generator; $\Sigma$ is a variance matrix comprising a covariance and a self-variance of the uncertainty variable of each load and a covariance and a self-variance of the uncertainty variable of each distributed generator; $F(\xi)$ is a probability distribution function; $\Pi(\mu, \Sigma)$ is the probability distribution set comprising a probability distribution of the uncertainty vector $\xi$ with the mean vector $\mu$ and the variance matrix $\Sigma$.

19. The non-transitory computer storage memory medium according to claim 16, wherein the objective function is denoted by a formula of:

$$\max_{s_i \geq 0} \sum_{i \in \Psi_{DG}} S_i$$

where, i denotes a serial number of the buses, $S_i$ is an installed capacity variable of the distributed generator at a bus i, which is non-negative; and $\Psi_{DG}$ is a set of all distributed generators.

20. The non-transitory computer storage memory medium according to claim 16, wherein solving the objective function according to the bilinear matrix inequality constraint, comprises:
applying a sequential convex optimization on the objective function based on the bilinear matrix inequality constraint.

* * * * *